United States Patent
Orr

(12) 
(10) Patent No.: US 6,760,535 B1
(45) Date of Patent: Jul. 6, 2004

(54) METHOD AND APPARATUS FOR CACHE MANAGEMENT FOR A DIGITAL VCR ARCHIVE

(75) Inventor: Stephen Orr, Markham (CA)

(73) Assignee: ATI International SRL, Christchurch (BB)

(*) Notice: Subject to any disclaimer, the term of this patent is extended or adjusted under 35 U.S.C. 154(b) by 0 days.

(21) Appl. No.: 09/536,431

(22) Filed: Mar. 27, 2000

(51) Int. Cl.⁷ .......................... H04N 5/76; H04N 5/781
(52) U.S. Cl. ................. 386/46; 386/125; 369/13.04; 369/13.16; 369/13.25; 360/57; 360/66
(58) Field of Search .................. 386/46, 1, 45, 386/125, 126; 369/13.01, 13.02, 13.04, 13.16, 13.25, 53.1, 116; 360/57, 59, 60, 66, 114.01; H04N 5/76, 5/781, 9/79

(56) References Cited

U.S. PATENT DOCUMENTS

| | | | | |
|---|---|---|---|---|
| 5,787,445 A | * | 7/1998 | Daberko | ..................... 707/205 |
| 5,831,943 A | * | 11/1998 | Kurita et al. | ............ 369/13.27 |
| 2003/0040917 A1 | * | 2/2003 | Fiedler | ....................... 704/500 |

* cited by examiner

Primary Examiner—Thai Tran
(74) Attorney, Agent, or Firm—Vedder, Price, Kaufman & Kammholz, P.C.

(57) ABSTRACT

An apparatus marks files within a content archive. The content archive contains a database that has a plurality of content files. The content archive also contains a plurality of entries or records. Each of the entries corresponds to a distinct one of the plurality of content files. Each of the entries also includes a played field that is automatically set when the corresponding content file has been played. The content archive also includes a writing module that is configured to record a new content file to the content archive and, if insufficient space is available, to overwrite a content file for which the played fields are set. According to one aspect, the plurality of entries also includes an entry corresponding to an overwritten content file previously contained within the database that is no longer contained within the database. The database may contain references to content no longer in the database.

57 Claims, 3 Drawing Sheets

Digital Video Recorder 10

| SHOW TAG 160 | PROTECTED FIELD 170 | PLAYED FIELD 180 | TIME RECORDED 190 |
|---|---|---|---|
| SHOW 1 | Y | Y | 09.04.2000 10:30:00 |
| SHOW 2 | N | N | 09.02.2000 9:30:00 |
| SHOW 3 | N | N | 08.11.2000 4:00:00 |
| SHOW 4 | N | Y | 07.14.2000 3:00:00 |
| SHOW X | N | Y | 01.02.1998 2:30:00 |
| SHOW Y | N | Y | 02.16.1998 4:00:00 |
| SHOW Z | N | Y | 06.24.1998 7:00:00 |

Content Database 150

METHOD AND APPARATUS FOR CACHE MANAGEMENT FOR A DIGITAL VCR ARCHIVE

FIELD OF THE INVENTION

The invention relates generally to digital video recorders, and more particularly to management of a video archive for a digital personal video recorder (PVR).

BACKGROUND OF THE INVENTION

The emergence of digital video recorders has allowed the home entertainment user to record video and audio programming with exceptionally high resolution. Depending on the capacity of the storage media used, several full-length feature movies and other programming can be stored on a single hard drive. Using data compression, a user can store large amounts of video and audio data on a typical hard drive.

Unfortunately, even extremely high capacity hard drives may not be adequate to store all the video and audio data that a user may want to keep. Many users enjoy watching films and sporting events, for example, many times before deleting or erasing such programming from storage media. Also, as the already enormous variety of programming available to a typical home theater user continues to grow still further, many home theater users program their home entertainment centers to record large amounts of programming and later scan through what has been recorded to decide what is worth watching. Accordingly, even high capacity disk drives may not be adequate for many users, if all information once stored remains on the hard drive.

Typically, when a video hard drive fills with video programming and can no longer record additional programming, subsequent attempts to record video programming cause the hard drive to delete the oldest data. The hard drive overwrites old data with the new video programming. Some hard drives allow a user to identify particular television programs or other programming stored on the hard drive as undeletable. The hard drive does not delete such video programming. Nevertheless, the hard drive erases and overwrites the oldest video data on the hard drive that is not identified as undeletable, upon attempting to write new video programming to the hard drive. This is a particular problem for busy people who may not have an opportunity to review all of the video programming stored on a hard drive as the hard drive begins to fill. Many users simply select and watch programs stored on the hard drive according to the user's mood at a particular time, without reviewing and manually marking programs as undeletable. In other words, the user's intervention is only to watch shows, and the user may not always attend to the manual selection and identification of programs as undeletable.

Accordingly, there is a need for a method and apparatus that prioritizes programming stored on a video hard drive such that, when the hard drive has insufficient space to store additional programming, programs that have already been watched are deleted before programs that have not yet been watched. Instead of deleting less recently recorded video programming before proceeding to more recently recorded video programming, a method and apparatus in accordance with the present invention deletes programs that have already been watched before proceeding to programs that have not yet been watched.

DETAILED DESCRIPTION OF A PREFERRED EMBODIMENT OF THE INVENTION

A digital video recorder in accordance with one embodiment of the present invention maintains a content database within the video hard drive. For each program stored on the video hard drive, or for each program within a selected portion of the video hard drive, the digital video recorder maintains a field or bit that identifies whether the corresponding program has already been played by a user. When a user watches a television program or listens to an audio file, or otherwise plays a program that is stored on the video hard drive, the digital video recorder sets the corresponding field or bit to indicate that the program has now been played. If the user later attempts to record additional programming for which the video hard drive lacks sufficient space to store, the video hard drive selectively protects programming that has not been played, even if doing so erases more recently-recorded programming that has been played.

Figure 1:
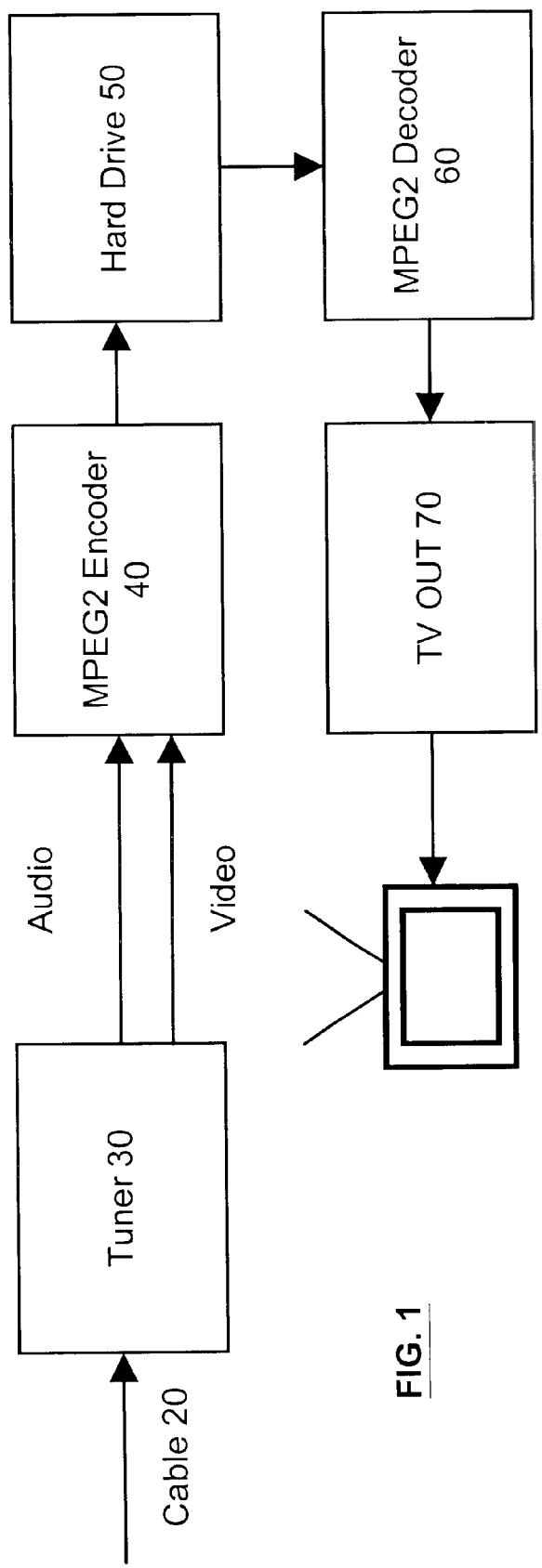
FIG. 1 shows a typical digital video recorder, in accordance with both a conventional system and one embodiment of the present invention.

FIG. 1 shows a typical digital video recorder, in accordance with both a conventional system and one embodiment of the present invention. A cable 20 provides audio and visual programming to the video recorder 10. The cable 20 may be an actual physical cable, such as a coaxial cable providing programming from a cable television provider, or may be a satellite television receiver or set top box from one or more cable television providers or satellite television providers. The cable 20 may also be a digitized version of radio frequency television transmissions from local television broadcasters.

A tuner 30 receives the digital signals from the cable 20 and separates audio from video data. Although synchronized, audio and video data have far different data processing requirements. The tuner 30 provides an audio and video data path to an MPEG 2 encoder 40. The MPEG 2 encoder 40 compresses both the audio and video data, and stores the compressed audio and video data on a hard drive 50. The hard drive 50 may be, for example, a 30-gigabyte hard drive.

The tuner 30 may be replaced with any device capable of receiving digitized information. For example, the tuner 30 may be replaced with a digital audio satellite system, a digital video satellite system, a digital cable receiver, an integrated service digital network (ISDN) system, or other similar system.

When a user desires to play programming that resides on the hard drive 50, the user identifies the programming via a user interface. The user interface may be, for example, an on screen programming guide that accesses the hard drive 50 and receives user input via the television remote control. The digital video recorder 10 decompresses or decodes the data from the hard drive 50, using an MPEG 2 decoder 60. A TV OUT 70 algorithm formats the decompressed data for a television set. If desired, the TV OUT 70 may be replaced with, for example, a computer CRT, flat panel, or other suitable viewing device.

Figures 2, 3:
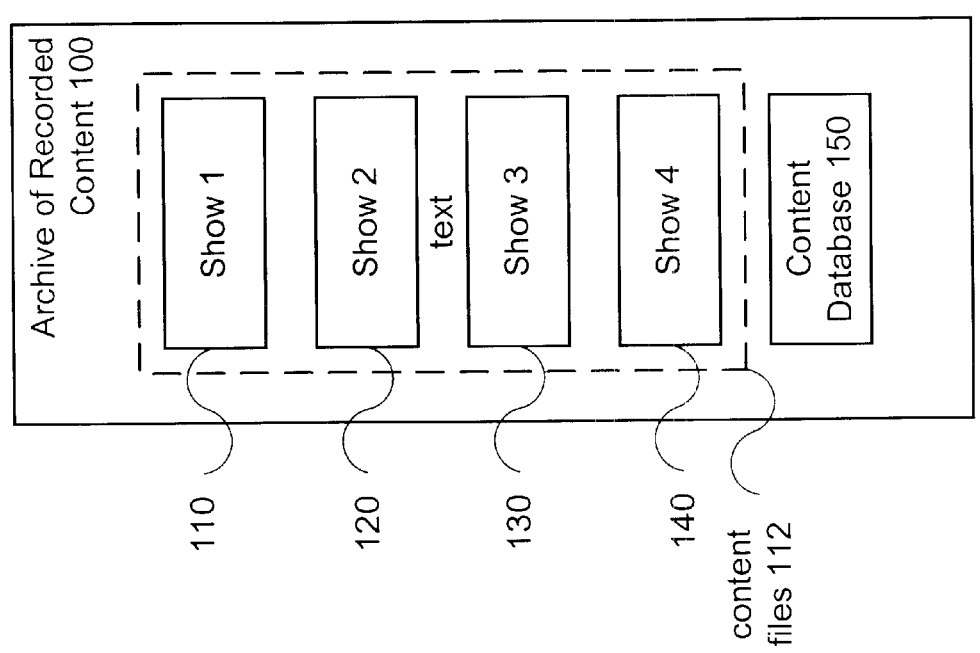
FIG. 2 shows an archive of recorded content 100, in accordance with one embodiment of the present invention.
FIG. 3 shows the content database of FIG. 2 in greater detail.

FIG. 2 shows an archive of recorded content 100, in accordance with one embodiment of the present invention. The archive includes compressed audio and video data for four different shows. The archive of recorded content 100 includes several content files 112. The content files 112 include a show 1 file 110, a show 2 file 120, a show 3 file 130, and a show 4 file 140.

The archive of recorded content 100 may be, for example, a digital magnetic storage medium such as a hard drive, digital tape, or removable drive. Alternately, the archive of recorded content 100 may be a central storage device coupled to the other devices of the system across a network or across the Internet. Several systems may share an archive of recorded content 100; accordingly, several television sets within a home, of different personnel within an office or production studio, may watch different television programs retrieved from a common archive of recorded content 100.

The archive of recorded content 100 also includes a content database 150. The content database 150 includes searchable information that the digital video recorder 10 obtains when creating each of the files. For example, when the digital video recorder 10 creates the show 1 file 110, the digital video recorder 10 concurrently creates a record within the content database 150. The record within the content database 150 includes information about the programming stored within the show 1 file 110.

The content database 150 includes several entries, or records. Each entry corresponds to a content file that resides among the content files 112, or that has been in the database. The content database 150 may be implemented in any digital storage format. For example, the content database 150 may reside in a single database table. Alternately, the content database 150 may reside in several relational tables, or in a linked list or other format.

According to one embodiment of the present invention, the digital video recorder includes a writing module. The writing module is configured to record a new content file to the content archive and, if insufficient space is available, to overwrite a content file for which the played fields are set. When insufficient space is available, the writing module selects one or more content files for which the played fields are set, and then overwrites the selected content files with the new content file. Different configurations are possible for select one or more content files.

In accordance with one embodiment of the present invention, each of the content files contains a plurality of portions. For example, a two-hour show may have two one-hour portions, or four half-hour portions, or a one-hour portion and two half-hour portions. Each portion has a played field that is automatically set when the corresponding portion has been played. The writing module is configured to record a new content file to the content archive and, if insufficient space is available, to overwrite a portion of a content file for which the played fields are set.

A show is divided into portions when the show is recorded or watched in its entirety. For example, the writing module is programmed to divide a show into half-hour portions. Each show that is recorded is divided into half-hour portions. If desired, however, the show may be divided into portions as portions become needed. For example, if a two-hour show has been played and subsequently the writing module determines that the content files lack sufficient space to store a half-hour show, the two-hour show may be divided into a half-hour portion and a 90-minute portion. The writing module may then overwrite the half-hour portion.

The writing module may divide a show, or portions of a show, into further portions according to various methods. A manufacturer or a user may program the writing module to select smaller shows, such as one-hour shows, before selecting larger shows, such as two-hour shows. If desired, the manufacturer or a user may program the writing module to select larger shows before selecting smaller shows. The manufacturer or a user may program the writing module to select an incomplete portion that has been played, such as the 90-minute portion in the previous example, before selecting a complete show that has been played.

According to one embodiment of the present invention, the writing module is a state machine or microcontroller having a plurality of video tapes. The writing module is configured to select a tape that has not been viewed, and to record a show on the selected video tape. The writing module then mechanically sets a switch in response to the tape being viewed. The writing module is configured to record a new content file to an empty portion of the content archive if sufficient space within the empty portion is available, and to overwrite a content file for which the played fields are set if insufficient space is available.

According to one embodiment of the present invention, the selection is based upon a least number of deletions. In other words, the writing module examines several possible ways to delete files to make sufficient space available, and then selects a way that requires deleting a minimum number of files. For example, a large content file (perhaps corresponding to a two-hour television program) and several smaller content file (several half-hour television programs) of the archive of recorded content 100 may already contain data. The writing module selects the large portion of the hard drive (corresponding to the two-hour program), since deleting the large portion of the hard drive provides the fewest number of deletions. The writing module writes the one-hour program over a portion of the two-hour program.

According to a second embodiment of the present invention, the selection is based upon a least number of deletions among the best fit. The best fit is a set of content files that most appropriately can be overwritten to accommodate the new content file. The writing module examines various sets of content files, and determines a quantity of storage occupied by the each of the sets. The quantity of storage may be stored in memory, on a hard drive, a combination of memory and a hard drive. If desired, other types of storage may be used, such as analog or digital magnetic tape or removable storage. The writing module selects a set for overwriting from among the content files for which the played fields are set. The selected set occupies a quantity of storage minimally exceeding the quantity of storage required by the new content file.

In other words, the writing module examines several possible ways to delete files to make sufficient space available, and then selects a way that requires deleting a minimum number of files. For example, a large content file (corresponding to a two-hour television program), several moderately sized content files (perhaps corresponding to one-hour television programs) and many smaller content files (corresponding to half-hour television programs) of the archive of recorded content 100 may already contain data.

If the writing module must overwrite sufficient data to store a one-hour television program, the writing module first determines a best fit. The best fit includes a group of content files each containing one of the several moderately sized content files that corresponding to one-hour television programs. The best fit also includes a group of content files each containing two of the many smaller content files corresponding to half-hour television programs. After determining all of the groups within the best fit, the writing module then determines the group that requires deleting a minimum number of files. Accordingly, the writing module selects one of the several moderately sized content files that corresponding to one-hour television programs.

In some embodiments, the user can provide user input that forces a selection within the writing module. The digital video recorder is programmable to allow the user to provide the user input. The user input allows a user to manually set a played field for particular entries of the database, according to the user's preferences. The writing module selects a content file for overwriting from among the content files for which the played fields are set, based upon a best fit to the content being added.

In accordance with some embodiments of the present invention, the digital video recorder also includes a recovery module. The user may enter the user input via a recovery module. The recovery module resets the played field, and recovers content marked as played if the content has not yet been overwritten. Once the user provides input to reset the played field, the digital video recorder operates as though the content file has not yet been played. The content file is preserved from any overwriting.

In accordance with some embodiments, the digital video recorder also includes a recording suppression module. The recording suppression module disables recording of a new content file when a show tag corresponding to the new content file matches a show tag of any content file within the database. In other words, the recording suppression module prevents the same show from being recorded twice.

In some embodiments, the recording suppression module appends a show tag corresponding to the new content file to a show tag of a content file already contained within the database and further operative to disable recording of the new content file. This appending can be useful, for example if television producers begin adding information to the show tags. If television producers begin including close captioning, a television ratings system, or other information to their broadcasts, the digital video recorder adds the new information to the show tag of the record corresponding to the pre-existing content file. The show tag contains searchable information pertaining to the corresponding content file.

In some embodiments, the show tag also includes a program guide information field. In some embodiments, the program guide information field includes an episode number. In other embodiments, the program guide information field includes a program title and a name of a guest star. In still other embodiments, the show tag field includes a close caption correlation text, or the show tag field includes a program identifier. Accordingly, the show tag allows subsequent storage operations to determine whether a content file already exists on the hard drive before re-recording the content file.

After a content file has been overwritten, the entry and the played field persist. In accordance with one embodiment of the present invention, if a show that has been played and overwritten is rebroadcast, the writing module may re-record the show. The user may program the writing module to record new content, even if an entry already exists for the new content and the played field for the entry is set. A user may, for example, decide that available space on the hard drive should be used to re-record shows that have been overwritten.

In one embodiment, the writing module re-records shows that have been overwritten as new content. The writing module, in response to such re-recording, sets the played field of the entry corresponding to the new content. Setting the played field of the new content allows the writing module to overwrite the content file as needed.

In one embodiment, the writing module re-records shows that have been overwritten as new content, but only if the writing module can do so without overwriting anything else. In other words, the writing module re-records shows that have already been seen and overwritten, but only if the writing module can do so using only uncommitted locations in memory or on the hard drive. The writing module, in response to such re-recording, sets the played field of the entry corresponding to the new content. Setting the played field of the new content allows the writing module to overwrite the content file as needed.

FIG. 3 shows the content database 150 of FIG. 2 in greater detail. The content database 150 includes several records, each record having a plurality of fields. The first field in each record is a show tag 160. The show tag 160 may be implemented as any searchable information relating to a television program, audio stream, video stream, or other information. In one embodiment, the show tag 160 contains a large amount of information regarding a television program stored in a corresponding content file such as show 1 file 110. In one embodiment of the present invention, the digital video recorder 10 receives a large amount of information while receiving video programming from the cable 20. Specifically, a content provider includes the large amount of information within the horizontal and vertical blanking intervals of the audio and video data that the tuner 30 receives from the cable 20. Each record within the content database 150 of FIG. 3 corresponds to a show file within the archive of recorded content 100 of FIG. 2.

According to one embodiment of the present invention, the show tag 160 field of the content database 150 stores all of the information received within the VBI information (Vertical Blanking Interval). If desired, the VBI may be replaced with a Web based EPG, DTV data packets, or other way to get program information. In another embodiment of the present invention, the manufacturer of the digital video recorder 10 configures the digital video recorder 10 to select a subset of the information, and to store only the selected portion of the information within the show tag 160. In a third embodiment of the present invention, the user either programs the digital video recorder 10 to select a user determined subset of the VBI information (Vertical Blanking Interval), Web based EPG, DTV data packets, or other program information, or selects the subset of the information on a program by program basis.

Each record within the content database 150 also includes a protected field 170. The protected field 170 is a user configurable field that enables the user to prohibit deletion of a programming file. If the user determines that a television program or other programming file within the archive of recorded content 100 should be saved from deletion, then the user can access the protected field 170 of the content database 150 within the record corresponding to the selected programming file. The protected field operative when set to selectively disable deletion, even when the played field is set.

Each record within the content database 150 also includes a played field 180. Whenever the user plays the content of a programming file, for example, the show 1 file 110 of FIG. 2, the content database 150 sets the played field 180 of the record corresponding to the programming file. By setting the field, the content database 150 enables subsequent searching for programming that has already been played. In one embodiment of the present invention, a user may manually set the played fields. The user may access the played field via a user input on a remote control unit.

Each record within the content database 150 also includes a time recorded field 190. The time recorded field includes a time stamp that is generated when the show is recorded. The time recorded field 190 allows the system to identify the "older" shows within the archive.

Shows 1, 2, and 3 are entries which are currently in the database. Shows X, Y, and Z reference older shows which have been watched and subsequently deleted.

Figure 4:
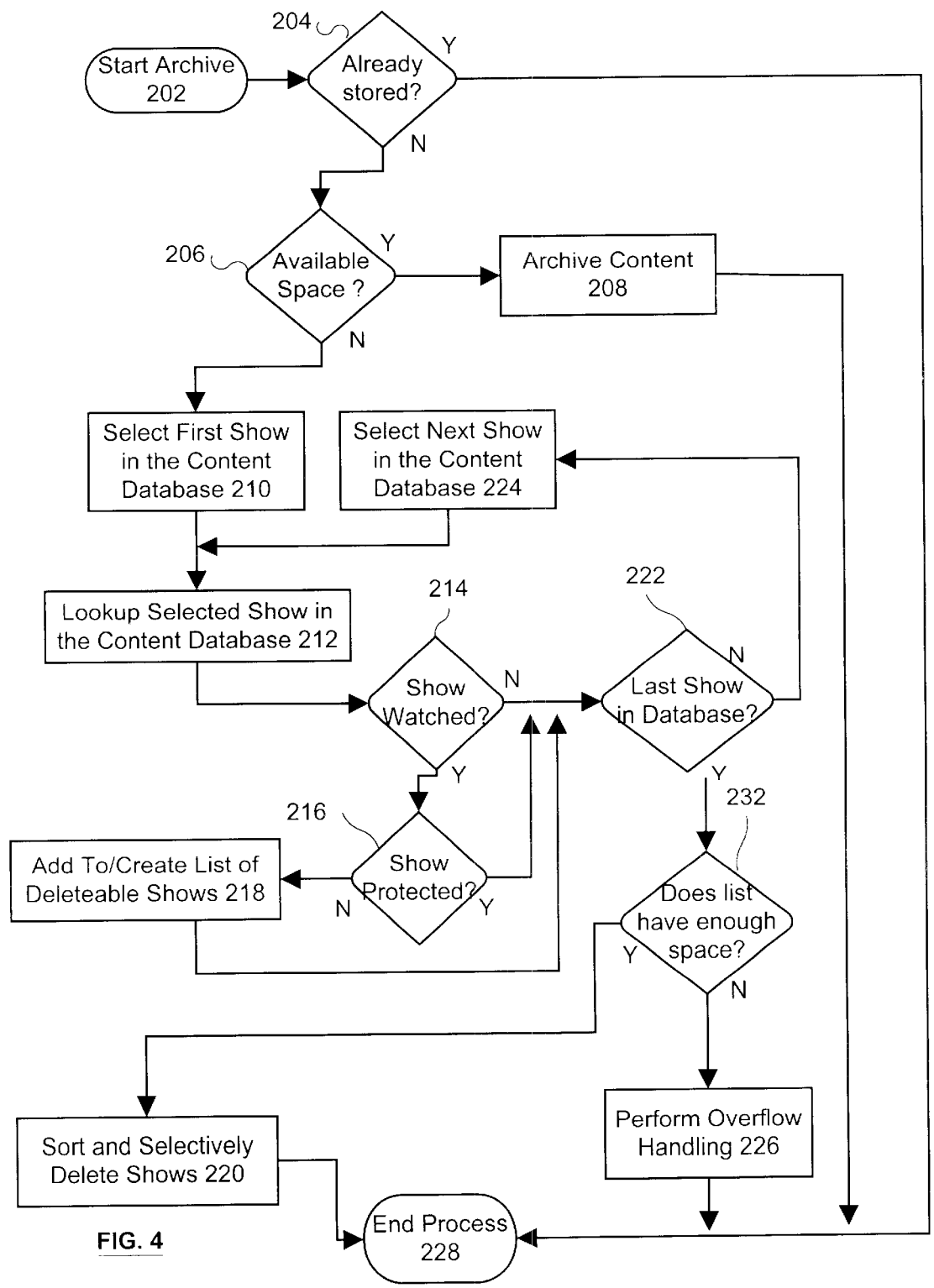
FIG. 4 shows a method according to one embodiment of the present invention.

FIG. 4 shows a method according to one embodiment of the present invention. At Step 202, the method begins the archiving process. The method begins at Step 202 whenever the user indicates a command to store video or audio data on the hard drive 50. At Step 204, the method determines whether the programming already resides on the hard drive. The method performs Step 204 by comparing sync pulse information belonging to the programming with similar information stored within the show tags 160 of the content database 150. If the sync pulse information of the programming matches the similar information found on the hard drive, then the method determines that the show has already been recorded and is located on the hard drive and aborts the recording by proceeding directly to Step 228.

If the programming has not yet been recorded or otherwise is not found on the hard drive, then the method proceeds to Step 206 and determines whether the hard drive has sufficient available space to record the programming. Because it may be difficult to determine ahead of time whether content received over a data channel is too large to fit within the available space on the hard drive, Step 206 may actually be performed upon a write error to the hard drive. In the absence of such an error, the hard drive finds sufficient space to store the programming, and proceeds to Step 208. At Step 208, the method stores the programming content within a new show field that the method creates within the archive of recorded content 100 (shown in FIG. 2).

If at Step 206 the method determines that the hard drive lacks sufficient space to store the programming (or upon a write error to the hard drive), the method begins a loop. At Step 210, the method examines the first record of the content database 150. At Step 212, the method retrieves the protected field 170 and the played field 180 of the selected record. At Step 214, if the show has not been watched, then control passes to Step 222. At Step 222, the loop determines whether the selected record of the content database 150 is the last record within the content database 150. If the selected record is not the last record, then at Step 224 the loop selects the next record in the content database 150 and returns to Step 212.

If the method determines at Step 214 that the show has been watched, at Step 216, the method determines whether the show is protected. If the show is protected, the method proceeds to Step 222 as though the show had not been watched.

The loop from Step 212 to Step 224 continues until the method either finds the last record of the content database 150, or finds a record that has been watched and is not protected. Whenever the method finds a record corresponding to a show that has been watched and is not protected, the method adds the record to a list of deletable shows at Step 218. When the loop encounters the last show in the database, the method determines at Step 232 whether the total data content of the list of deletable shows is at least as great as the data requirements for the show being recorded. If the list of deletable shows has sufficient media space, control proceeds to Step 220 where the method sorts and selects which program files from among the list of deletable files is most expendable. If the list does not have enough space to accommodate the new file even if everything on the list of deletable shows is deleted, then control proceeds to Step 226 and handles an overflow condition. The method creates the overflow condition when the method determines that there is insufficient space on the hard drive, even if everything in the list of deletable shows is deleted.

The sort and selectively delete shows Step 220 includes one of a variety of algorithms for selecting which show to delete. For example, the sort and selectively delete Step 220, in one embodiment in accordance with the present invention, uses a best fit algorithm. The best fit algorithm determines the smallest number of files that can be deleted to provide adequate storage space for the new data file. Various different misfit algorithms can be used for the sort and selectively delete shows Step 220, including fewest deletions, including selecting the oldest recordings when various combinations have equal number of deletions.

The described embodiment of the present invention allows a user to prioritize programming stored on a video hard drive such that, when the hard drive has insufficient space to store additional programming, programs that have already been watched are deleted before programs that have not yet been watched. Instead of deleting less recently recorded video programming before proceeding to more recently recorded video programming, the exemplary embodiment of the present invention deletes programs that have already been watched before proceeding to programs that have not yet been watched.

It should be understood that the implementation of other variations and modifications of the invention in its various aspects will be apparent to those of ordinary skill in the art, and that the invention is not limited by the specific embodiments described. For example, the content database 150 may be implemented as an additional field appended to each of the content files within the archive of recorded content. It is therefore contemplated to cover by the present invention, any and all modifications, variations, or equivalents that fall within the spirit and scope of the basic underlying principles disclosed and claimed herein.

What is claimed is:

1. An apparatus for marking files within a content archive comprising:
    a database including a plurality of content files and further including a plurality of entries, each of the entries corresponding to a distinct one of the plurality of content files, each of the entries further comprising a played field that is automatically set when the corresponding content file has been played; and
    a writing module configured to record a new content file to the content archive and, if insufficient space is available, to overwrite a content file for which the played fields are set.

2. The apparatus of claim 1, wherein:
    the plurality of entries further includes an entry corresponding to an overwritten content file previously contained within the database that is no longer contained within the database.

3. The apparatus of claim 1, further comprising:
    a user input operatively coupled to allow a user to manually set a played field.

4. The apparatus of claim 1, wherein:
    an entry also has a protected field operative when set to selectively disable deletion, even when the played field is set.

5. The apparatus of claim 1, wherein:
the writing module is further configured to select a content file for overwriting, from among the content files for which the played fields are set, based on a least number of deletions.

6. The apparatus of claim 1, wherein:
the writing module is a state machine having a plurality of video tapes, the writing module configured to select a tape that has not been viewed, and to record a show on the selected video tape, and to mechanically set a switch in response to the tape being viewed.

7. The apparatus of claim 6, wherein:
the writing module configured to record a new content file to an empty portion of the content archive if sufficient space within the empty portion is available, and to overwrite a content file for which the played fields are set.

8. The apparatus of claim 7, wherein:
the writing module is a microcontroller.

9. The apparatus of claim 1, wherein:
each of the content files contains a plurality of portions, each portion having a played field that is automatically set when the corresponding portion has been played; and wherein
the writing module is configured to record a new content file to the content archive and, if insufficient space is available, to overwrite a portion of a content file for which the played fields are set.

10. The apparatus of claim 1, wherein:
the writing module is further configured to determine a plurality of sets of content files and a quantity of storage occupied by the each of the sets, and to select a set for overwriting having a quantity of storage minimally exceeding a new content file memory requirement from among the content files for which the played fields are set.

11. The apparatus of claim 1, wherein:
the writing module is further configured to select a content file for overwriting, from among the content files for which the played fields are set automatically.

12. The apparatus of claim 1, wherein:
the writing module is further configured to select a content file for overwriting, from among the content files for which the played fields are set, based on user input.

13. The apparatus of claim 1, further comprising:
a recovery module, operative to reset a played field that has been set upon receiving a user input, the reset played field operative to recover content marked as played if the content has not yet been overwritten.

14. The apparatus of claim 1, wherein:
the writing module is further configured to select a content file for overwriting, from among the content files for which the played fields are set, based upon a best fit to the content being added.

15. The apparatus of claim 14, wherein:
the writing module is configured to record new content for which an entry exists in the database, and for which the played field is set.

16. The apparatus of claim 15, wherein:
the writing module is configured to record new content for which an entry exists in the database, and for which the played field is set, into empty locations of storage.

17. The apparatus of claim 14, further comprising:
a recording suppression module, operative to disable recording of a new content file when a show tag corresponding to the new content file matches a show tag of any content file within the database.

18. The apparatus of claim 14, further comprising:
a recording suppression module, operative to disable recording of a new content file when a show tag corresponding to the new content file matches a show tag of any content file of which the corresponding played field is set.

19. The apparatus of claim 14, further comprising:
a recording suppression module operative, when a show tag corresponding to a new content file matches a show tag of any content file of which the corresponding played field is set, to append a show tag corresponding to the new content file to a show tag of a content file already contained within the database and further operative to disable recording of the new content file.

20. The apparatus of claim 14, wherein:
each of the entries further comprises a show tag field, the tag field containing searchable information pertaining to the corresponding content file.

21. The apparatus of claim 20, wherein:
the show tag field includes a program guide information field that includes at least one of a group consisting of an episode number, a program title, and a guest star.

22. The apparatus of claim 20, wherein:
the show tag field includes a close caption correlation text.

23. The apparatus of claim 20, wherein:
the show tag field includes a program identifier.

24. A method for marking files within a content archive comprising:
creating an entry for each of a plurality of content files within a database;
upon detecting that a corresponding content file has been played, setting a played field corresponding to content file;
upon recording a new content file to the content archive, overwriting a content file for which the played fields are set if insufficient space is available to record the new content file.

25. The method of claim 24, further comprising:
upon recording a new content file to the content archive, determining whether the new content file matches an overwritten content file previously contained within the database that is no longer contained within the database.

26. The method of claim 24, further comprising:
receiving a user input operative to manually set a played field.

27. The method of claim 24, further comprising:
selectively disabling deletion of a content file when a corresponding protected field is set.

28. The method of claim 24, wherein:
determining a plurality of sets of content files for overwriting, from among the content files for which the played fields are set;
selecting a set of content files from among the plurality of sets of content files, based least number of deletions upon recording a new content file to the content archive; and
overwriting the set of content files for which the played fields are set if insufficient space is available to record the new content file.

29. The method of claim 24, further comprising:
determining a plurality of sets of content files for overwriting, from among the content files for which the played fields are set;

selecting a set of content files from among the plurality of sets of content files, based on a least number of deletions among the best fit;

overwriting the content files a content file for which the played fields are set if insufficient space is available to record the new content file.

30. The method of claim 24, wherein:

determining a plurality of sets of content files for overwriting, from among the content files for which the played fields are set;

selecting a set of content files from among the plurality of sets of content files, based on user input; and overwriting the content files a content file for which the played fields are set if insufficient space is available to record the new content file.

31. The method of claim 24, further comprising:

upon receiving a user input, resetting a played field that has been set; and recovering a content file of which the corresponding played field is set if the content has not yet been overwritten.

32. The method of claim 24, wherein:

determining a plurality of sets of content files for overwriting, from among the content files for which the played fields are set;

selecting a set of content files from among the plurality of sets of content files, based upon a best fit to the content being added; and overwriting the content files a content file for which the played fields are set if insufficient space is available to record the new content file.

33. The method of claim 32, further comprising:

disabling recording of a new content file when a show tag corresponding to the new content file matches a show tag of any content file within the database.

34. The method of claim 32, further comprising:

disabling recording of a new content file when a show tag corresponding to the new content file matches a show tag of any content file of which the corresponding played field is set.

35. The method of claim 32, further comprising:

when a show tag corresponding to a new content file matches a show tag of any content file of which the corresponding played field is set, appending a show tag corresponding to the new content file to a show tag of a content file already contained within the database; and when a show tag corresponding to a new content file matches a show tag of any content file of which the corresponding played field is set, disabling recording of the new content file.

36. The method of claim 32, further comprising:

when a show tag corresponding to a new content file matches a show tag of any content file of which the corresponding played field is set, appending a show tag corresponding to the new content file to a show tag of a content file already contained within the database; and when both (i) a show tag corresponding to a new content file matches a show tag of any content file of which the corresponding played field is set, and (ii) there is no empty space in storage, disabling recording of the new content file; and when either (i) a show tag corresponding to a new content file does not match any show tag of any content file of which the corresponding played field is set, or (ii) there is empty space in storage, recording the new content file.

37. The method of claim 32, further comprising:

when a show tag corresponding to a new content file matches a show tag of any content file of which the corresponding played field is set, appending a show tag corresponding to the new content file to a show tag of a content file already contained within the database; and when both (i) a show tag corresponding to a new content file matches a show tag of any content file of which the corresponding played field is set, and (ii) there is neither empty space nor played content files in the storage, disabling recording of the new content file;

when both (i) a show tag corresponding to a new content file matches a show tag of any content file of which the corresponding played field is set, and (ii) there is a plurality of played content files but insufficient empty space in the storage, recording of the new content file by overwriting seen content that has been played.

38. The method of claim 32, further comprising:

accessing searchable information within a show tag field pertaining to a corresponding content file.

39. The method of claim 32, further comprising:

retrieving at least one of a group consisting of an episode number, a program title, and a guest star from a searchable information within a show tag field pertaining to a corresponding content file.

40. The method of claim 32, wherein:

retrieving a close caption correlation text from a searchable information within a show tag field pertaining to a corresponding content file.

41. The method of claim 32, wherein:

retrieving a program identifier from a searchable information within a show tag field pertaining to a corresponding content file.

42. A digital video recorder for marking files within a content archive comprising:

a database comprising a plurality of content files and further comprising a plurality of entries, each of the entries corresponding to a distinct one of the plurality of content files, each of the entries further comprising a played field that is automatically set when the corresponding content file has been played; and a writing module configured to record a new content file to the content archive and, if insufficient space is available, to overwrite a content file for which the played fields are set.

43. The digital video recorder of claim 42, wherein:

the plurality of entries further includes an entry corresponding to an overwritten content file previously contained within the database that is no longer contained within the database.

44. The digital video recorder of claim 42, further comprising:

a user input operatively coupled to allow a user to manually set a played field.

45. The digital video recorder of claim 42, wherein:

an entry also includes a protected field operative when set to selectively disable deletion, even when the played field is set.

46. The digital video recorder of claim 42, wherein:

the writing module is further configured to select a content file for overwriting, from among the content files for which the played fields are set, based on a least number of deletions.

47. The digital video recorder of claim 42, wherein:

the writing module is further configured to select a content file for overwriting, from among the content files for which the played fields are set, based on a least number of deletions among the best fit.

48. The digital video recorder of claim 42, wherein:

the writing module is further configured to select a content file for overwriting, from among the content files for which the played fields are set, based on user input.

49. The digital video recorder of claim 42, further comprising:

a recovery module, operative to reset a played field that has been set upon receiving a user input, the reset played field operative to recover content marked as played if the content has not yet been overwritten.

50. The digital video recorder of claim 42, wherein:

the writing module is further configured to select a content file for overwriting, from among the content files for which the played fields are set, based upon a best fit to the content being added.

51. The digital video recorder of claim 42, further comprising:

a recording suppression module, operative to disable recording of a new content file when a show tag corresponding to the new content file matches a show tag of any content file within the database.

52. The digital video recorder of claim 42, further comprising:

a recording suppression module, operative to disable recording of a new content file when a show tag corresponding to the new content file matches a show tag of any content file of which the corresponding played field is set.

53. The digital video recorder of claim 42, further comprising:

a recording suppression module operative, when a show tag corresponding to a new content file matches a show tag of any content file of which the corresponding played field is set, to append a show tag corresponding to the new content file to a show tag of a content file already contained within the database and further operative to disable recording of the new content file.

54. The digital video recorder of claim 42, wherein:

each of the entries further comprises a show tag field, the show tag field containing searchable information pertaining to the corresponding content file.

55. The digital video recorder of claim 45, wherein:

the show tag field includes a program guide information field that includes at least one of a group consisting of an episode number, a program title, and a guest star.

56. The digital video recorder of claim 45, wherein:

the show tag field includes a close caption correlation text.

57. The digital video recorder of claim 45, wherein:

the show tag field includes a program identifier.

\* \* \* \* \*